May 17, 1966  H. H. KAY  3,251,342
ANIMAL CAGE FEEDING AND DRINKING ASSEMBLY CONSTRUCTION
Filed Feb. 9, 1965  2 Sheets-Sheet 1
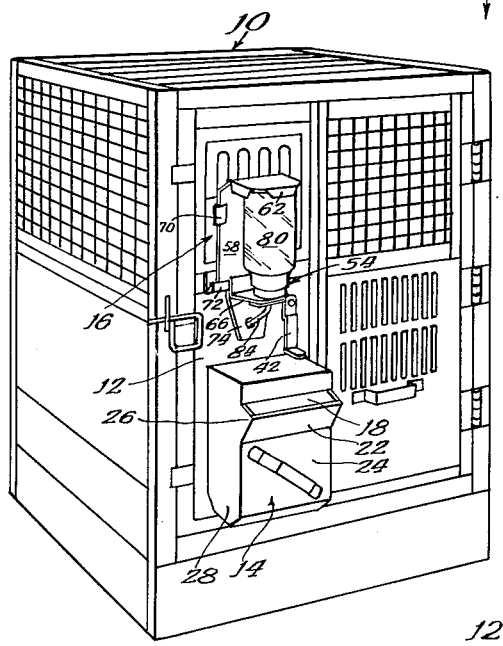
Inventor:
Harry H. Kay
By: Leonard ~~~
Attorney May 17, 1966  H. H. KAY  3,251,342
ANIMAL CAGE FEEDING AND DRINKING ASSEMBLY CONSTRUCTION
Filed Feb. 9, 1965  2 Sheets-Sheet 2
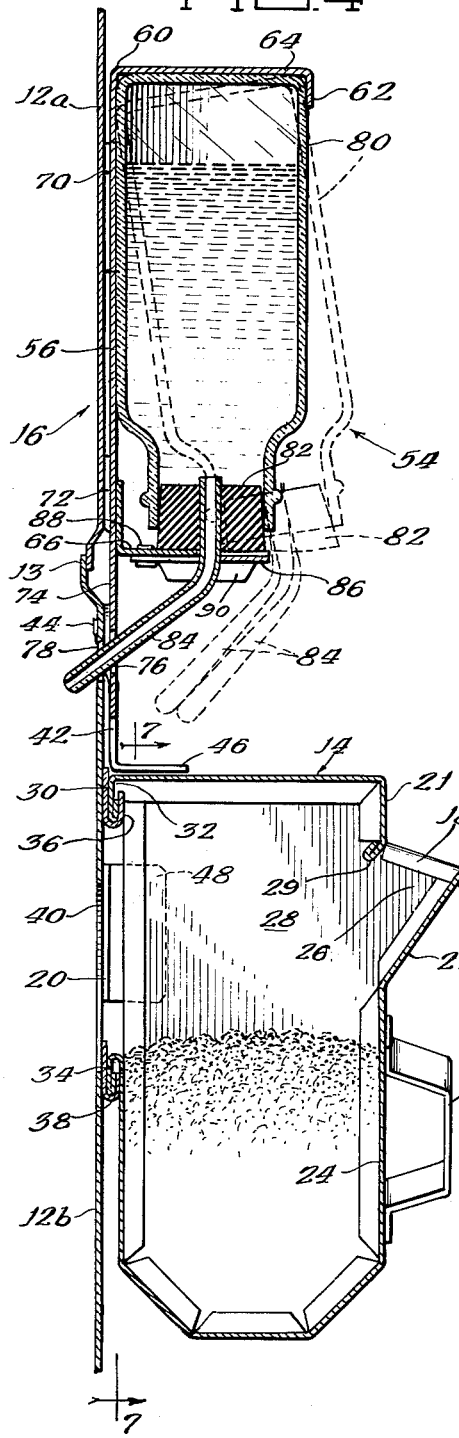
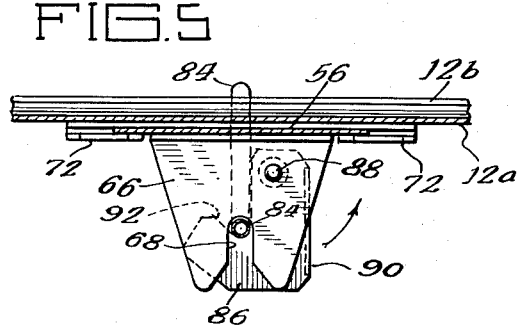
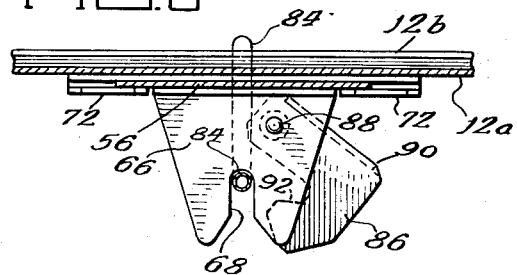
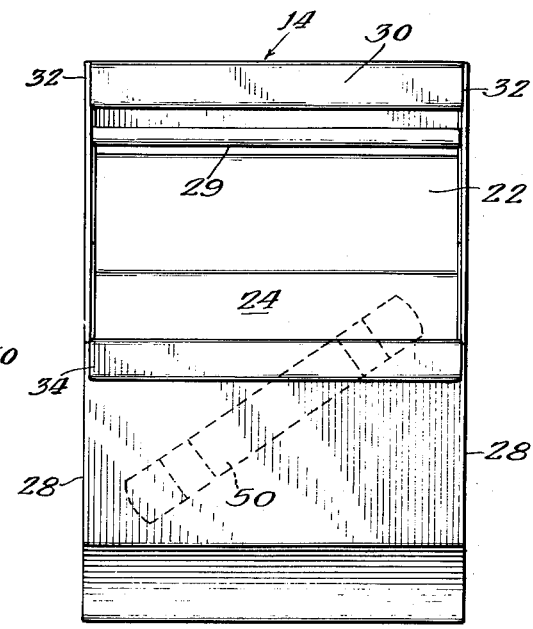
Inventor:
Harry H. Kay
By: Leonard U. (ieman)
Attorney United States Patent Office 3,251,342
Patented May 17, 1966

3,251,342
ANIMAL CAGE FEEDING AND DRINKING
ASSEMBLY CONSTRUCTION
Harry H. Kay, c/o Acme Metal Products, Inc.,
7757 S. Chicago Ave., Chicago, Ill. 60619
Filed Feb. 9, 1965, Ser. No. 431,350
6 Claims. (Cl. 119—18)

This invention relates to animal cages, and more specifically to the construction of the feeding and drinking portion of cages for animals such as monkeys, used for laboratory purposes.

It is very well known that certain animals, particularly monkeys, are highly prone to displace and upset food and water receptacles. Accordingly, cages for such animals must have feeding and watering structures which are securely moored to resist the sometimes remarkable strength and ingenuity displayed by the animals in dislodging such parts of their cages.

Heretofore, the securing of such equipment as feeders and water-bottles to monkey-cages in a manner calculated to assure against dislodging has been accomplished in a manner not fully consistent with achievement of the ease of installation and removal, and ready cleanability, which become of great importance in laboratories and similar installations having large numbers of animals, where the aggregate of the time required for these operations becomes of substantial economic importance, in addition to the mere matter of convenience.

The present invention provides a novel construction for the feeding and watering portions of animal cages of this type which makes it very simple to install and remove the food and water containers, and to keep them in clean condition, while at the same time fully assuring that they cannot, upon installation, be upset or otherwise displaced by the animals. With the present construction, a large number of cages may be rapidly serviced as regards the food and water provisions, without introducing any likelihood of dislodgement by the animals, and at the same time without any substantial addition to cost. Indeed, as will hereinafter be seen, the simplicity of mounting and demounting by the attendant is accompanied by a simplicity of structure which makes the present construction of a cost at least as low as that of the less rapid and convenient constructions heretofore required for comparable security of mounting.

The structure of the invention will best be understood from description of the invention as embodied in a monkey-cage, as illustrated in the annexed drawing. In the drawing:

FIGURE 1 is a view in perspective of the exterior of an animal cage, including the feeding and drinking assembly of the present invention;

FIGURE 2 is a front view in elevation of the feeding and drinking assembly of the cage of FIGURE 1;

FIGURE 3 is a top plan view of the feeding and drinking assembly, an upper plate portion thereof being in section taken along line 3—3 of FIGURE 2;

FIGURE 4 is a longitudinal sectional view taken along line 4—4 of FIGURE 2 in the direction indicated;

FIGURE 5 is a horizontal sectional view taken along the offset line 5—5 of FIGURE 2;

FIGURE 6 is a sectional view similar to FIGURE 5, but showing, in the open position, a latch shown in the closed position in FIGURE 5; and FIGURE 7 is a back view in elevation of a feeder, taken along line 7—7 of FIGURE 4 in the direction indicated.

The cage 10 has a feeding and watering assembly mounted on a wall panel 12, which may conveniently, but not necessarily, be a portion of the front hinged door portion of the cage as illustrated. The panel comprises two plates 12a and 12b formed to have offset portions which overlap and are secured, as by welding, at 13.

In the illustrated embodiment (all of which is preferably fabricated from conventional sheets of stainless steel for easy cleanability), the feed receptacle 14 is mounted on the panel 12 beneath the water-supplying or drinking assembly 16. The panel is imperforated in the region of mounting, ample ventilation being provided by slots in the upper portion of the panel and elsewhere on the cage. The feed receptacle is of the general form of a rectangular box, with an appropriate filling aperture 18 on the front, and an animal access aperture 20 in the back. The front aperture 18, spaced from the top by vertical lip 21, is formed by an outwardly bent-out portion 22 of the front 24, somewhat spaced from the top end, with corresponding triangular ears or forward extensions 26 on the sides 28, thus forming a more or less upwardly facing trough-like aperture 18 into which food may readily be poured from bags and similar containers. The lower edge of the front lip 21 is bent inwardly and rolled, as shown in FIGURE 4 at 29, to facilitate loading and eliminate cutting edges. The bottom of the food receptacle is formed with a diagonal taper at the front and back to form a trough-like tapered structure at the bottom for the usual purpose of concentrating granular and similar feed materials when the level is low.

The animal access aperture on the rear of the food receptacle is a large rectangular opening spaced from the top by a vertical lip 30, the side edges of which abut on the sides 28 of the feeder to form substantially closed corners 32 therewith. A second lip or flange 34 is formed at the bottom of the opening. Cooperating upwardly facing lips or hooks 36 and 38 are secured, as by welding, to the panel 12, and serve to seat the lips 30 and 34 of the feed receptacle, the upper hook 36 fitting between the sides 28 and seating the vertical lip 30. A fairly large aperture 40 in the panel registers with the aperture 20 in the feed receptacle.

Above the feed receptacle, a vertical plate or latch 42 is pivotally mounted at 44, and has a forwardly extending tab 46 formed integrally therewith, the tab 46 being above the feed receptacle 14 by a distance smaller than the vertical overlap of the hooks 36 and 38 and the lips 30 and 34, so that disengagement of the receptacle from the panel can be accomplished only when the latch 42, held in the downward position by gravity, is pivotally raised (as shown dotted in FIGURE 2). Such unlocking, although obviously very simple for an attendant, cannot be accomplished by an animal, to which the latch 42 is of course completely inaccessible. Sidewise motion of the feed receptacle is limited by stop 48 on the panel, and engagement of sides 28 and upper hook 36 at the corners 32. A handle 50 is provided to facilitate grasping of the feeder for installation, removal, cleaning, etc.

The watering assembly 16 has, in addition to the panel, a bottle carrier or holder 52 and a water-bottle assembly generally designated as 54.

The carrier or holder has a body portion 56 in the form of a flat plate 58. At its upper end, this flat plate is bent perpendicularly forward at 60, and the edge-tabs 62 of this forwardly bent portion are bent downward to form a generally cup-shaped downwardly facing recess or base-holder 64, which retains the inverted base of the bottle assembly. To the lower end of the body portion of the bottle-holder plate 58, there is secured, as by spot-welding, a forwardly extending shelf or bracket 66, the forward edge of which is notched out to form a rearwardly extending slot 68. To hold the bottle in the holder while the locking means described below are being manipulated in installing the bottle, the base-holder 64 and shelf 66 receive the bottle snugly between them and resiliently yield by bending.

The bottle-holder is slidably mounted in slides or guides 70 secured to the panel 12, the downward sliding movement thereof being limited by stop tabs or channel members 72, which engage the lower end of the bottle-holder body portion.

Integral with the body portion of the bottle-holder is a depending extension portion 74. This portion, and the panel adjacent thereto, have formed therein substantially registered apertures 76 and 78.

The bottle assembly 54 has an ordinary glass bottle 80 of conventional construction, with a stopper 82 of rubber or rubber-like resin in the inverted top, and a rigid nozzle or drinking-tube 84 extending through, and fixedly mounted in, the resilient stopper. The drinking-tube 84 has its upper end extending axially through the stopper, and its lower end extends angularly downward through the apertures 76 and 78, terminating on the opposite, or interior, side of the panel.

The sizes of the registered apertures 76 and 78 are only very slightly larger than the outer dimension of the drinking-tube 84, the clearances in FIGURE 4 being exaggerated for purposes of clarity. It will thus be seen that the extension of the drinking-tube through the apertures interlocks the bottle assembly 54, the bottle carrier or holder 52 and the panel 12. However, the bottle may readily be removed by an attendant by grasping the lower portion or neck of the bottle and pulling it outwardly, thus deforming the resilient stopper as shown in dotted form in FIGURE 4, the drinking-tube moving outward through the slot 68 in this operation. When the drinking-tube is completely withdrawn from the registered apertures 76 and 78, it of course snaps back to its original orientation with respect to the bottle. The lower or end surface of the stopper 82 is preferably in tight abutment with the upper surface of the shelf or bracket 66, this aiding the interlocking of the entire structure against dislodgement by manipulation of the drinking tube by an animal within the cage. For further security, the illustrated embodiment employs a latch 86, in the form of a plate pivotally attached at 88 to the under surface of the shelf or bracket 66, and having a bent-over thumb-handle portion 90 for ready manipulation. The latch 86 is formed with a locking edge 92 which is rotated to the position to engage the tube or nozzle 84 to lock it against dislodgement from the slot 68. Preferably, the edge 92 is formed to provide slight camming or hooking action, i.e., to have a region of slightly increased radius from the rotation point in the closed or latched position, so that the resilience of the stopper 82 acts to prevent the latch 86 from rotating to the unlocked position due to vibration, etc.

As will be readily seen, the opening of the latch and the pulling outward of the neck of the bottle to remove the drinking-tube from the matched apertures free the entire bottle assembly from the bottom portion of the holder, and disengages the entire bottle assembly from the holder. At the same time, the holder is itself completely released and may be slid upwardly, disengaged and removed for cleaning, if so desired. The bottle assembly is correspondingly easily installed, after replacement of the holder, by merely inserting the base of the bottle in the top part of the carrier or holder, and rotating the bottle assembly into place with the tube 84 held in the fingers to deform the stopper 82 in inserting the tube through the matched apertures 76 and 78, the entire assembly snapping into interlocked condition when this is completed, and the locking being further reinforced by closing of the latch 86.

As will be obvious to those skilled in the art, the illustrated embodiment is merely one of many forms in which the invention may be utilized. Accordingly, the scope of the invention should not be determined by mere visual similarity to the particular embodiment illustrated, but should be determined from the structural definitions in the appended claims.

What is claimed is:
1. In an animal cage having an apertured wall, a water-bottle mounted on the outside surface of the wall above the aperture, and a rigid drinking tube extending from the lower end of the water-bottle through the wall aperture, the improved construction having:
 (a) a bottle-holder having an upper portion holding the bottle and a lower portion having an aperture adapted to register with the wall aperture,
 (b) and keyed engagement means on the bottle-holder and the cage wall mounting the bottle-holder for vertical sliding motion between a first position wherein the apertures are in register and a second position wherein the holder is disengaged from the wall,
 (c) the drinking tube extending through the registered apertures to lock the holder in said first position,
  so that the holder is vertically locked in position but is unlocked by removal of the bottle.
2. The structure of claim 1 characterized by:
 (d) said upper portion of the bottle-holder having a downwardly facing recess receiving the upper end of the bottle and an upwardly facing guide surface slidingly supporting the lower end of the bottle, so that the bottle may be removed and replaced, and the assembly unlocked and locked, by sliding the lower end of the bottle outwardly and inwardly to remove and replace the drinking-tube from and into the apertures.
3. The structure of claim 2 further having:
 (e) a latch on the bottle-holder operable to unlock and lock the lower end of the bottle.
4. The structure of claim 3 further having:
 (f) the lower end of the bottle comprising a resilient stopper having the drinking-tube extending therefrom,
 (g) and the latch comprising a hook member pivoted for horizontal motion beneath said lower end and selectively engaging the drinking-tube.
5. An animal cage having:
 (a) a wall apertured to pass a drinking tube,
 (b) a bottle-holder having a vertical plate body portion, an outwardly extending generally cup-shaped downwardly facing top portion, an outwardly extending shelf portion downwardly spaced from the top portion and having a slot extending inwardly from its outer edge,
 (c) the body portion of the holder extending beneath the shelf portion and having an aperture registering with the wall aperture,
 (d) vertical slide means on the wall receiving the body portion of the holder and stop means limiting the downward sliding motion and supporting the body portion in said position of aperture register,
 (e) a bottle assembly comprising a glass bottle having a resilient stopper in the end opposite the base end, and a rigid drinking tube extending through the stopper and having its outer end extending angularly away from the axis of the bottle,
 (f) the base of the bottle being in the cup-shaped top portion of the holder and the stopper abutting the shelf portion, the drinking tube being in the slot with said outer end extending downwardly and inwardly into the cage interior through the apertures,
 (g) and a latching member pivotally mounted on the under surface of the shelf portion and engaging the drinking tube to lock it into the slot.
6. The cage of claim 5 further having a feeder box assembly beneath the registered apertures comprising:
 (h) a feed receptacle having an outward opening for the filling thereof and an inward opening for animal access,
 (j) hooking engagement means acting between the cage wall and the feed receptacle and disengageable by lifting of the receptacle,
 (k) and a pivoted locking member on the cage wall above the receptacle having a portion depending downwardly to lock the receptacle against such lifting.

References Cited by the Examiner
UNITED STATES PATENTS

| | | | |
|---|---|---|---|
| 2,311,207 | 2/1943 | Bussey | 119—18 |
| 2,653,569 | 9/1953 | Forester | 119—18 |
| 2,946,308 | 7/1960 | Harris | 119—18 |
| 2,988,044 | 6/1961 | Adelberg et al. | 119—15 |

SAMUEL KOREN, *Primary Examiner.*
ALDRICH F. MEDBERY, *Examiner.*